(12) United States Patent
Baratakke et al.

(10) Patent No.: US 7,483,990 B2
(45) Date of Patent: Jan. 27, 2009

(54) METHOD, APPARATUS, AND PROGRAM FOR INFORMING A CLIENT WHEN A SERVER IS BUSY IN THE TRANSFER CONTROL PROTOCOL

(75) Inventors: Kavitha Vittal Murthy Baratakke, Austin, TX (US); Vinit Jain, Austin, TX (US); Ketan Priyakant Pancholi, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 10/443,667

(22) Filed: May 22, 2003

(65) Prior Publication Data

US 2004/0236802 A1    Nov. 25, 2004

(51) Int. Cl.
*G06F 15/16* (2006.01)
(52) U.S. Cl. .................. 709/227; 709/220; 709/235; 709/224; 709/248
(58) Field of Classification Search .............. None
See application file for complete search history.

(56) References Cited

U.S. PATENT DOCUMENTS 5,193,151 A * 3/1993 Jain ........................ 709/237
6,205,120 B1 * 3/2001 Packer et al. ............... 370/235

OTHER PUBLICATIONS

Jiang, Hao. "Passive Estimation of TCP Round-Trip Times." ACM SIGCOMM Computer Communications Review. vol. 32, No. 3, pp. 75-88. Jul. 2002. ACM Press.*
Stevens, W. Richard. TCP/IP Illustrated, vol. 1. The Protocols. Addison-Wesley. 1994. pp. 281.*
RFC 793: Transmission Control Protocol DARPA Internet Program Protocol Specification. Sep. 1981. Information Sciences Institute, University of Southern California. 88 pages.*

* cited by examiner

*Primary Examiner*—Jason D Cardone
*Assistant Examiner*—Jeffrey R Swearingen
(74) *Attorney, Agent, or Firm*—Duke W. Yee; Diana L. Roberts-Gerhardt; Lisa L. B. Yociss (57) ABSTRACT

The server side Transfer Control Protocol is modified so that the server returns a SYNACK message with the window size equal to zero if the server is busy. When a client sends a TCP connection request and receives a synchronization acknowledgement message with the window size equal to zero, the client knows that the server received the connection request and that the server is busy. The client may then send an acknowledgement message to complete the three-way synchronization handshake, thus successfully completing the connection. Thereafter, the client side TCP may probe the server side TCP until a window update message is received from the server. When the server sends a window update message to set the window size to a non-zero size, the client knows that the server is no longer busy and the client application may then use the TCP connection.

20 Claims, 5 Drawing Sheets

METHOD, APPARATUS, AND PROGRAM FOR INFORMING A CLIENT WHEN A SERVER IS BUSY IN THE TRANSFER CONTROL PROTOCOL

BACKGROUND OF THE INVENTION

1. Technical Field

The present invention relates to network data processing systems and, in particular, to the transfer control protocol. Still more particularly, the present invention provides a method, apparatus, and program for informing a client when a server is busy in the transfer control protocol.

2. Description of Related Art

Transmission Control Protocol/Internet Protocol (TCP/IP) is a suite of communications protocols developed to network heterogeneous systems. The TCP/IP suite of protocols has become the global standard for communications.

Transmission Control Protocol (TCP) provides transport functions, which ensures that the total amount of bytes sent is received correctly at the other end. User Datagram Protocol (UDP), which is part of the TCP/IP suite, is an alternate transport that does not guarantee delivery. UDP is widely used for real-time voice and video transmissions where erroneous packets are not retransmitted.

Currently, when a server application is busy, the server side TCP drops incoming connection attempts. These connection attempts are referred to as synchronization messages or SYN segments. The client side TCP may then retransmit the SYN at a later time. The limitation of the current method is that the client does not know whether the server dropped the connection request or whether the network dropped the packet. Thus, the client may continue to repeatedly retransmit the SYN until the server returns a synchronization acknowledgement or the client side TCP times out.

If the server is busy, then the server side TCP may be repeatedly interrupted by the SYN, causing the server to examine the listener's queue to determine whether to accept the SYN request. For example, the client may repeat the SYN after one second, after two seconds, after four seconds, etc. This may repeat for up to seventy-five seconds, or more, before the client times out. This causes the server to unnecessarily act on many SYN requests. Furthermore, the client side TCP may also repeatedly send the SYN to the server not knowing whether the packet is even arriving at the server.

Therefore, it would be advantageous to provide an improved mechanism for informing a client when a server is busy in the transfer control protocol.

SUMMARY OF THE INVENTION

The present invention modifies the server side Transmission Control Protocol so that the server returns a synchronization acknowledgement message with the window size equal to zero if the server is busy. When a client sends a TCP connection request and receives a synchronization acknowledgement message with the window size equal to zero, the client knows that the server received the connection request and that the server is busy. The client may then send an acknowledgement message to complete the three-way synchronization handshake, thus successfully completing the connection. Thereafter, the client side TCP may probe the server side TCP until a window update message is received from the server. When the server sends a window update message to set the window size to a non-zero size, the client knows that the server is no longer busy and the client application may then use the TCP connection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
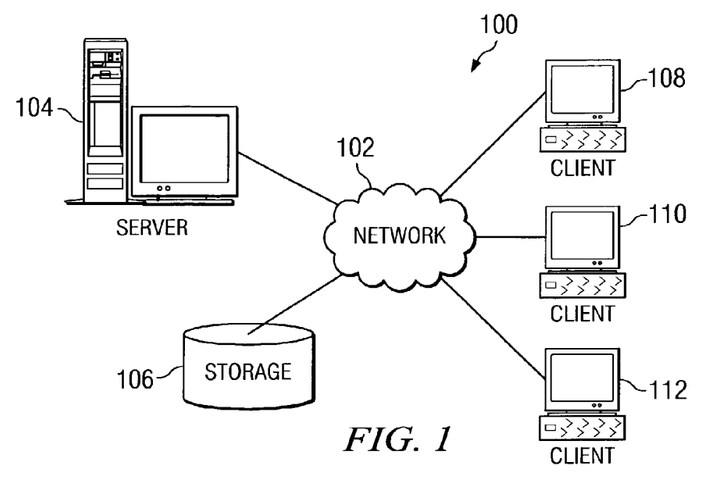
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In the depicted example, network data processing system 100 is the Internet with network 102 representing a worldwide collection of networks and gateways that use the Transmission Control Protocol/Internet Protocol (TCP/IP) suite of protocols to communicate with one another. Transmission Control Protocol (TCP) provides transport functions, which ensures that the total amount of bytes sent is received correctly at the other end.

A client, such as one of clients 108, 110, 112, must send a connection request to a server, such as server 104. These connection requests are referred to as synchronization messages or SYN segments. Currently, when a server application is busy, the server side TCP drops incoming connection attempts. The client side TCP may then retransmit the SYN at a later time.

The limitation of the current method is that the client does not know whether the server dropped the connection request or whether the network dropped the packet. Thus, the client may continue to retransmit the SYN repeatedly until the server returns a synchronization acknowledgement or the client side TCP times out. If the server is busy, then the server side TCP may be repeatedly interrupted by SYN requests, causing the server to examine the listener's queue to determine whether to accept the SYN request. The client side TCP may also repeatedly send the SYN to the server not knowing whether the packet is even arriving at the server.

In accordance with a preferred embodiment of the present invention, the server side TCP is modified so that the server returns a synchronization acknowledgement (SYNACK) message with the window size equal to zero if the server is busy. When a client sends a TCP connection request and receives a SYNACK with the window size equal to zero, the client knows that the server received the connection request and that the server is busy. The client may then send an acknowledgement (ACK) message to complete the three-way synchronization handshake, thus successfully completing the connection.

Thereafter, the client side TCP may probe the server side TCP until a window update message is received from the server. When the server sends a window update message to set the window size to a non-zero size, the client knows that the server is no longer busy and the client application may then use the TCP connection.

Figure 2:
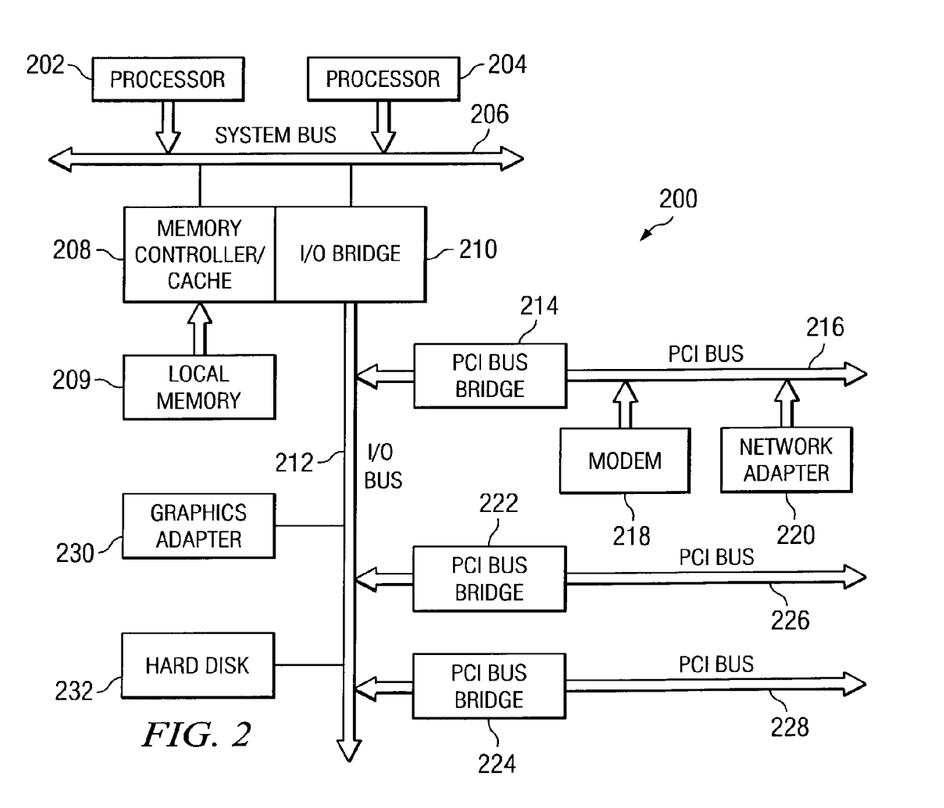
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
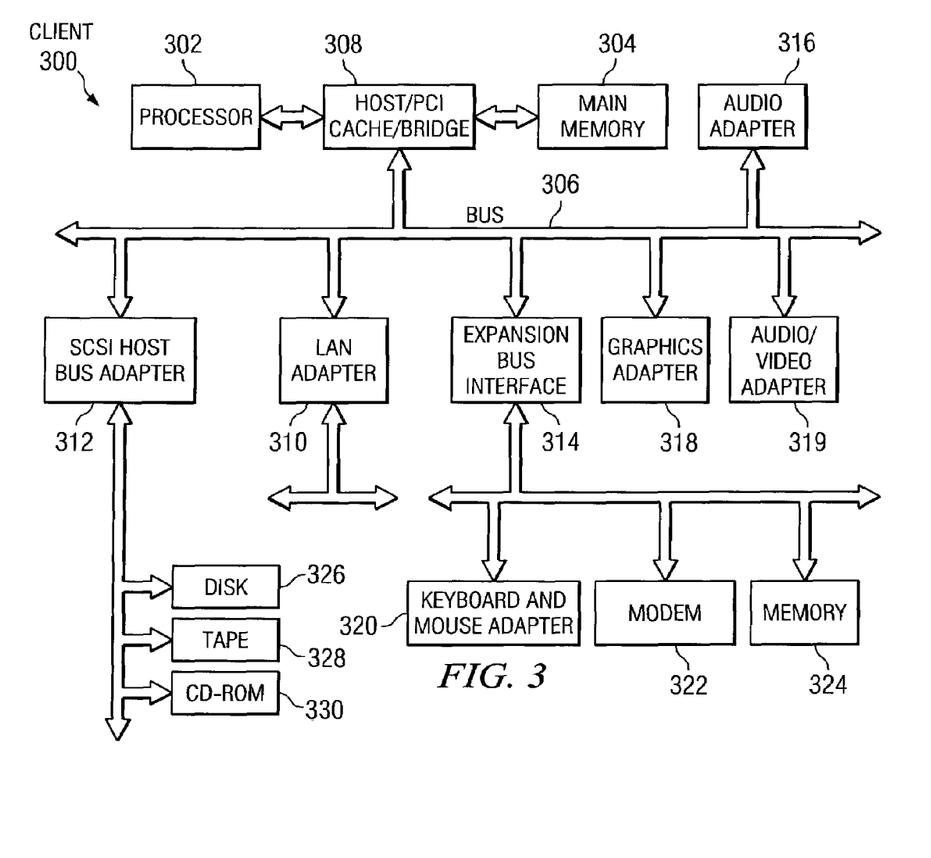
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as WINDOWS XP, which is available from Microsoft Corporation. An object oriented programming system such as JAVA may run in conjunction with the operating system and provide calls to the operating system from JAVA programs or applications executing on data processing system 300. JAVA is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
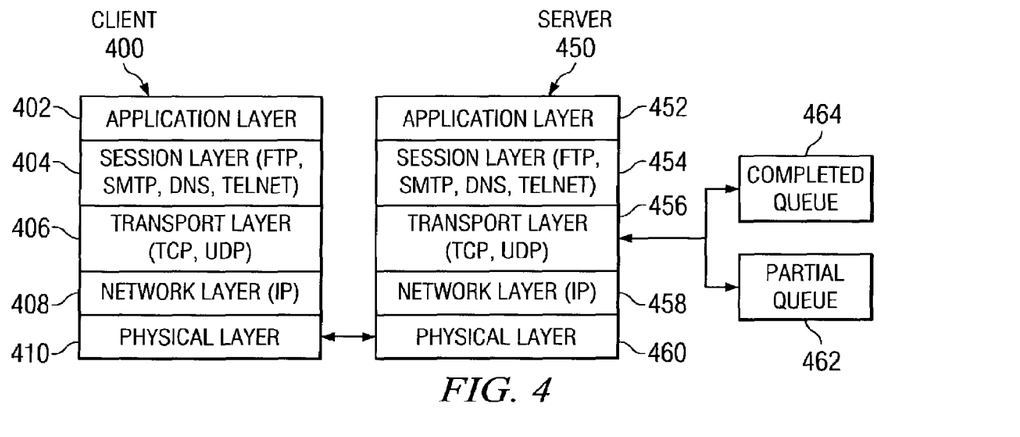
FIG. 4 is a diagram illustrating a software model in accordance with a preferred embodiment of the present invention.

With reference to FIG. 4, a diagram illustrating a software model is shown in accordance with a preferred embodiment of the present invention. Client 400 includes application layer 402, session layer 404, transport layer 406, network layer 408, and physical layer 410. The session layer 404 includes, for example, File Transfer Protocol (FTP), Simple Mail Transfer Protocol (SMTP), Domain Name System (DNS), and Telnet. Transport layer 406 includes Transmission Control Protocol (TCP) and User Datagram Protocol (UDP). In the depicted example, the network layer 406 uses the Internet Protocol (IP).

Server 450 includes application layer 452, session layer 454, transport layer 456, network layer 458, and physical layer 460. The session layer 454 includes, for example, File Transfer Protocol (FTP), Simple Mail Transfer Protocol (SMTP), Domain Name System (DNS), and Telnet. Transport layer 456 includes Transmission Control Protocol (TCP) and User Datagram Protocol (UDP). In the depicted example, the network layer 456 uses the Internet Protocol (IP).

Client 400 physically connects to server 450 through the physical layer, which may include network interface adapters, modems, and the like. The client must send a connection request (SYN) to the server. When the server side TCP receives a connection request, the server determines whether the listener's queue is full.

The listener's queue is divided into two queues: partial queue 462 and completed queue 464. The partial queue contains the connections that are yet to complete the three-way handshake. These connections are waiting for the final ACK from the client. The completed queue contains the connections that have completed the three-way handshake and are waiting for the application to accept the connection.

When the server is not busy (the listener's queue is not full) and accepts a SYN request, the server side TCP returns a SYNACK. Then, this connection is placed in partial queue 462. When the client side TCP receives the SYNACK, the client responds with an ACK to complete the three-way handshake. When the server side TCP receives an ACK, the connection is moved from partial queue 462 to completed queue 464. Preferably, the server side TCP examines the completed queue length to determine whether the server is busy; otherwise, a client may repeatedly send a SYN without subsequently sending an ACK and fill the partial queue, possibly causing a "Denial of Service" attack. If the completed queue length exceeds a predetermined threshold, then the server is busy and the window size is set to zero for the SYNACK.

In accordance with a preferred embodiment of the present invention, if server 450 receives a SYN and the listener's queue is full, the server side TCP returns a synchronization acknowledgement (SYNACK) message with the window size equal to zero if the server is busy. When client 400 sends a TCP connection request and receives a SYNACK with the window size equal to zero, the client knows that the server received the connection request and that the server is busy. The client may then send an acknowledgement (ACK) message to complete the three-way synchronization handshake, thus successfully completing the connection.

Thereafter, the client side TCP may probe the server side TCP until a window update message is received from the server. When server 450 sends a window update message to set the window size to a non-zero size, the client knows that the server is no longer busy and the client application may then use the TCP connection.

Figure 5:
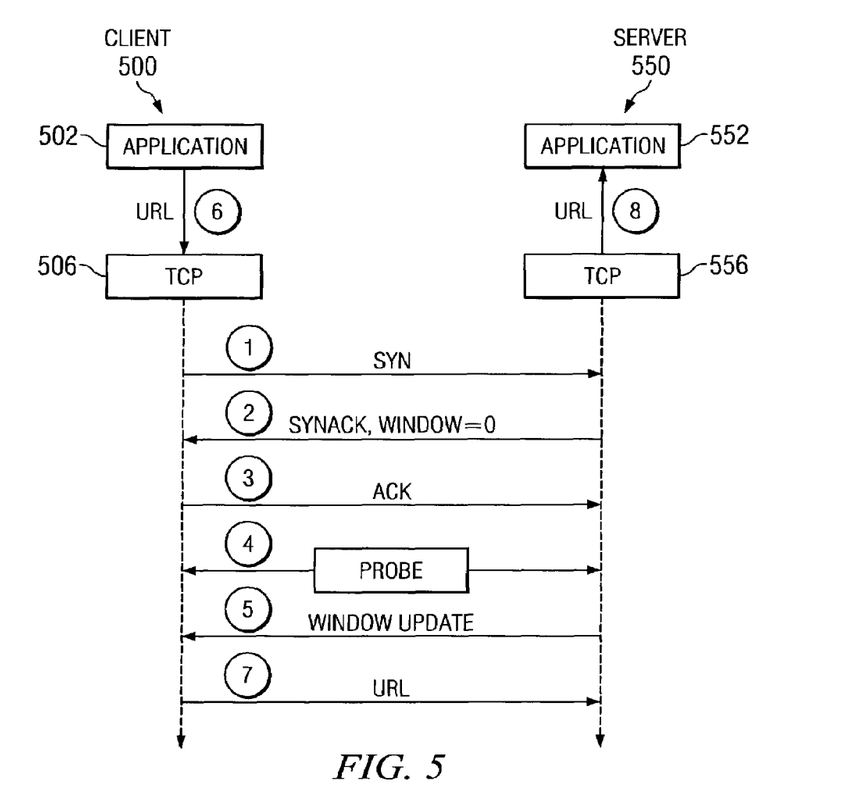
FIG. 5 is a data flow diagram illustrating the operation of a TCP connection between a client and a server in accordance with a preferred embodiment of the present invention.

With reference now to FIG. 5, a data flow diagram is shown illustrating the operation of a TCP connection between a client and a server in accordance with a preferred embodiment of the present invention. When application 502 in client 500 requires a TCP connection with server 550, TCP 506 sends a SYN to the server (step 1). Server side TCP 556 receives the SYN and determines whether the server is busy.

In this example, the server is busy; therefore, the server side TCP returns a SYNACK with the window size equal to zero (step 2). The client side TCP receives the SYNACK and responds with an ACK (step 3). The client side TCP may then report to application 502 that the connection was successful.

Once the connection completes, the client side TCP still knows that the server is busy. Thus, the client side TCP probes the server side TCP (step 4). If the client TCP sends a predetermined number of probes without receiving a response from the server, then the client TCP may quit the connection.

In the depicted example, the server TCP sends a window update (step 5) before the client side TCP quits the connection. The window update sets the window size to a non-zero value. The application now may send a Uniform Resource Locator (URL) to the TCP layer (step 6) and the client side TCP sends the URL to the server TCP (step 7). The server side TCP then passes the URL to server application 552.

Figure 6:
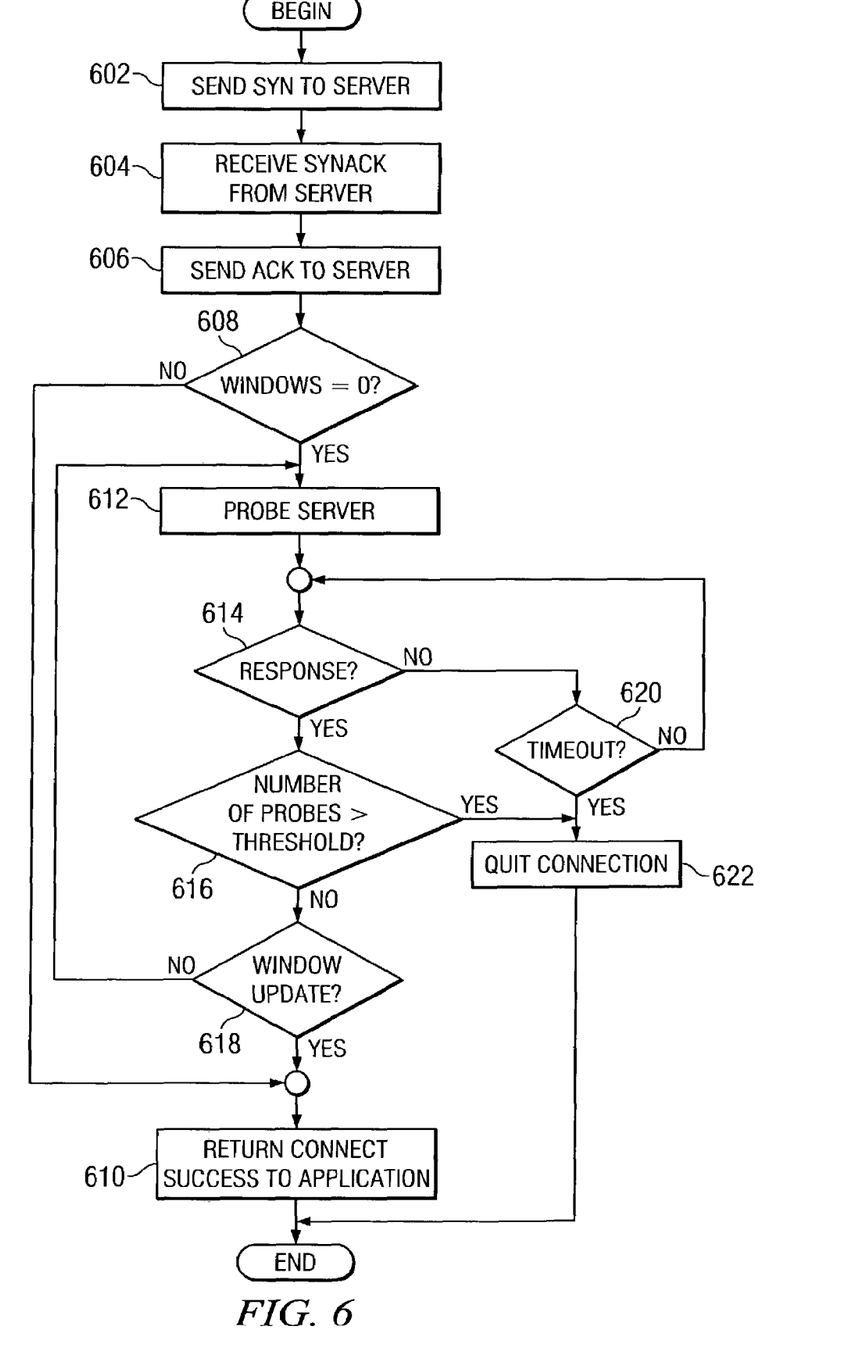
FIG. 6 is a flowchart illustrating the operation of a client side Transmission Control Protocol connection process in accordance with a preferred embodiment of the present invention.

Turning now to FIG. 6, a flowchart illustrating the operation of a client side Transmission Control Protocol connection process is shown in accordance with a preferred embodiment of the present invention. The process begins and sends a SYN to the server (step 602). Then, the process receives a SYNACK from the server (step 604) and returns an ACK to the server (step 606).

Next, a determination is made as to whether the window size is equal to zero (step 608). If the window size is not zero, the connection is complete and the server is not busy. Thus, the client returns a connect success to the application (step 610) and ends.

If the window size is zero in step 608, then the connection is complete, but the server is busy. Therefore, the client TCP probes the server (step 612). A determination is made as to whether a response to the probe is received (step 614). If a response is received, a determination is made as to whether the number of probes is greater than a predetermined threshold (step 616). If the number of probes does not exceed the threshold, a determination is made as to whether a window update is received (step 618).

If a window update setting the window size to a non-zero value is not received, then the process returns to step 612 to probe the server. However, if a window update is received in step 618, then the process returns a connect success to the application (step 610) and the process ends.

Returning to step 614, if a response to the probe is not received from the server, a determination is made as to whether a timeout occurs (step 620). The process will loop between step 614 and step 620 until a response is received in step 614 or the process times out in step 620. If the number of probes exceeds the predetermined threshold in step 616 or the process times out in step 620, then the client side TCP quits the connection (step 622) and the process ends.

Figure 7:
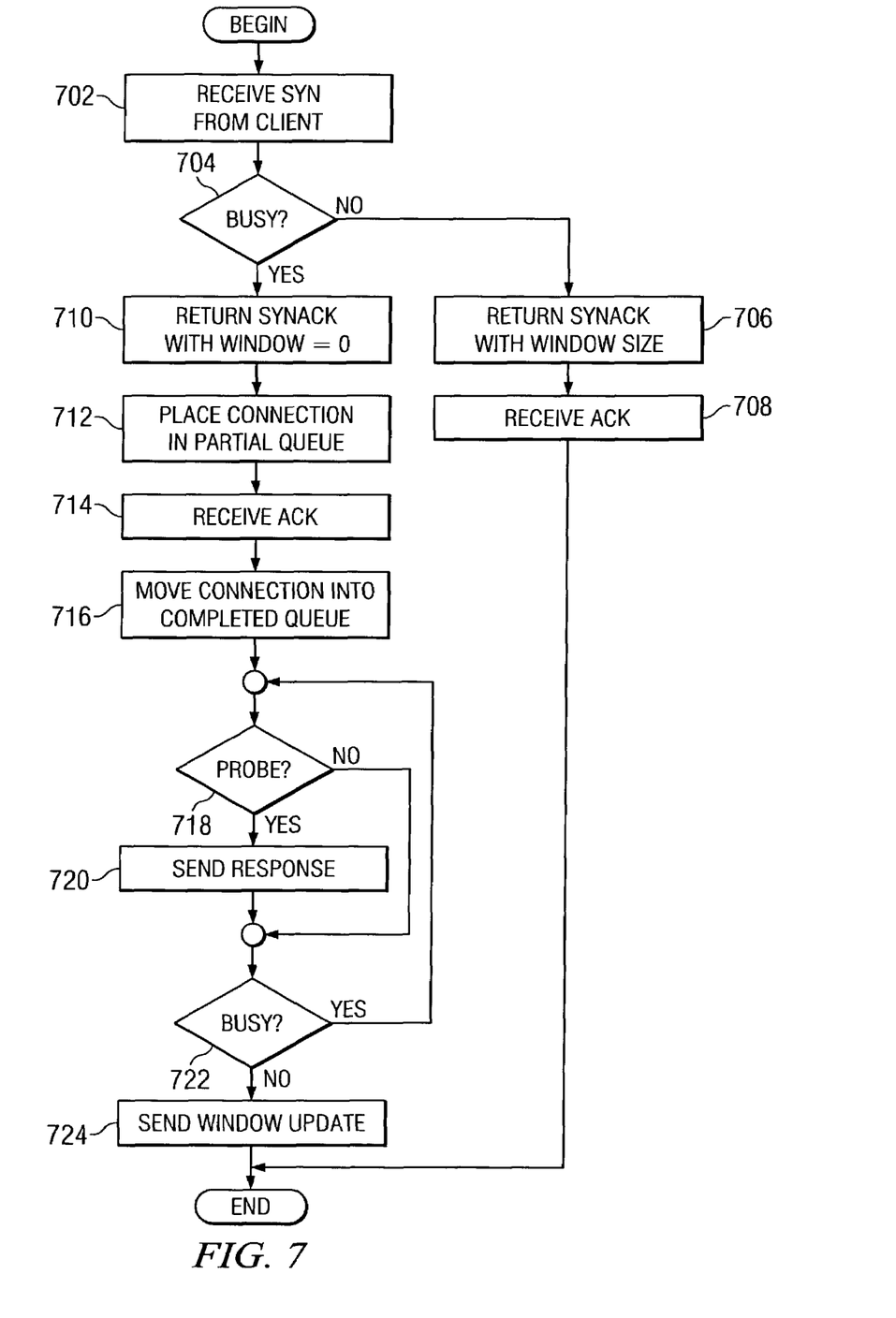
FIG. 7 is a flowchart illustrating the operation of a server side Transmission Control Protocol connection process in accordance with a preferred embodiment of the present invention.

Next, with reference to FIG. 7, a flowchart illustrating the operation of a server side Transmission Control Protocol connection process is shown in accordance with a preferred embodiment of the present invention. The process begins and receives a SYN from a client (step 702). Then, a determination is made as to whether the server is busy (step 704). As described above, this determination may be made, for example, by inspecting the completed queue length. If the server is not busy, the server TCP returns a SYNACK with the appropriate window size (step 706) and receives an ACK from the client (step 708) to complete the three-way handshake. Thereafter, the process ends.

If the server is busy in step 704, then the process returns a SYNACK with the window length equal to zero (step 710) and places the connection in the partial queue (step 712). Thereafter, the process receives an ACK from the client (step 714) and moves the connection into the completed queue (step 716).

Then, a determination is made as to whether a probe is received from the client (step 718). If a probe is received, the process sends a response to the client (step 720) and a determination is made as to whether the server is busy (step 722). If a probe is not received in step 718, the process continues directly to step 722 to determine whether the server is busy. If the server is busy, the process returns to step 718 to determine whether a probe is received. However, if the server is not busy in step 722, then the process sends a window update to the client (step 724) and ends.

Thus, the present invention solves the disadvantages of the prior art by modifying the server side TCP so that the server returns a synchronization acknowledgement message with the window size equal to zero if the server is busy. When a client sends a TCP connection request and receives a synchronization acknowledgement message with the window size equal to zero, the client knows that the server received the connection request and that the server is busy. The client may then send an acknowledgement message to complete the three-way synchronization handshake, thus successfully completing the connection. Thereafter, the client side TCP may probe the server side TCP until a window update message is received from the server. When the server sends a window update message to set the window size to a non-zero size, the client knows that the server is no longer busy and the client application may then use the TCP connection. No modifications to the client side TCP are needed. Therefore, this process is transparent to the client.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a server for processing a Transmission Control Protocol connection request, the method comprising:
   receiving a synchronization request from a client;
   determining whether the server is busy; and
   responsive to the server being busy, returning a synchronization acknowledgement message with a window size set to zero.

2. The method of claim 1, wherein the step of determining whether the server is busy includes determining whether a listener's queue for the server is full.

3. The method of claim 2, further comprising:
   responsive to receiving an acknowledgement from the client, placing the connection for the client in a completed queue, wherein the connection is a completed connection.

4. The method of claim 3, wherein the step of determining whether the server is busy includes determining whether a length of the completed queue is greater than a predetermined threshold.

5. The method of claim 3, further comprising:
   responsive to receiving a poll from the client, sending a response to the client.

6. The method of claim 1, further comprising:
   determining whether the server is no longer busy; and
   responsive to the server no longer being busy, sending a window update message to the client.

7. The method of claim 6, wherein the window update message sets the window size to a non-zero value.

8. The method of claim 6, wherein the step of determining whether the server is no longer busy includes determining whether a listener's queue is no longer full.

9. A computer program product, which is stored in a computer recordable medium, for processing a Transmission Control Protocol connection request in a server, the computer program product comprising:
   instructions for receiving a synchronization request from a client;
   instructions for determining whether the server is busy; and
   instructions, responsive to the server being busy, for returning a synchronization acknowledgement message with a window size set to zero.

10. The computer program product of claim 9, wherein the instructions for determining whether the server is busy includes instructions for determining whether a listener's queue for the server is full.

11. The computer program product of claim 9, further comprising:
    instructions for receiving an acknowledgement from the client; and
    instructions for placing the connection for the client in a completed queue, wherein the connection is a completed connection.

12. The computer program product of claim 11, wherein the instructions for determining whether the server is busy includes instructions for determining whether a length of the completed queue is greater than a predetermined threshold.

13. The computer program product of claim 9, further comprising:
    instructions for determining whether the server is no longer busy; and
    instructions, responsive to the server no longer being busy, for sending a window update message to the client.

14. The computer program product of claim 13, wherein the window update message sets the window size to a non-zero value.

15. A method in a server for processing a Transmission Control Protocol (TCP) connection request, the method comprising:
- receiving, by a TCP transport layer in the server, a synchronization request from a TCP transport layer in a client;
- determining, by the TCP transport layer in the server, whether the server is busy; and
- returning, by the TCP transport layer in the server to the TCP transport layer in the client, a synchronization acknowledgement message with a window size set to zero responsive to determining that the server is busy.

16. The method of claim 15, further comprising:
- determining, by the TCP transport layer in the server, whether the server is busy by determining whether a listener's queue for the server is full, the listener's queue including a completed queue and a partial queue;
- the completed queue including connections that have completed a three-way synchronization handshake between the server and the client;
- the three-way synchronization handshake being completed when the TCP transport layer in the server receives a final acknowledgement message from the TCP transport layer in the client, the client sending the final acknowledgement message responsive to the TCP transport layer in the client having received the synchronization acknowledgement message from the TCP transport layer in the server;
- the partial queue including connections that have not completed the three-way synchronization handshake in the partial queue; and
- connections that have not completed the three-way synchronization handshake being connections where the TCP transport layer in the server has sent the synchronization acknowledgement message but has not received the final acknowledgement message from the TCP transport layer in the client.

17. The method of claim 15, further comprising:
- determining, by the TCP transport layer in the server, whether the server is no longer busy; and
- sending, from the TCP transport layer in the server to the TCP transport layer in the client, a window update message to the TCP transport layer in the client responsive to the server no longer being busy.

18. The method of claim 17, further comprising:
- receiving, by the TCP transport layer in the server from the TCP transport layer in the client, a Uniform Resource Locator (URL), which was received responsive to the TCP transport layer in the server sending the window update message; and
- passing, by the TCP transport layer in the server, the URL to a server application.

19. The method of claim 15, further comprising:
- determining whether the server is no longer busy; and
- responsive to the server no longer being busy, sending a window update message to the client that sets the window size to a non-zero value.

20. The method of claim 15, wherein the step of determining whether the server is no longer busy includes determining whether a listener's queue is no longer full.

* * * * *